Jan. 13, 1948.   C. L. SCHAEFER ET AL   2,434,591
COIL WINDING APPARATUS
Filed June 27, 1945   3 Sheets-Sheet 3
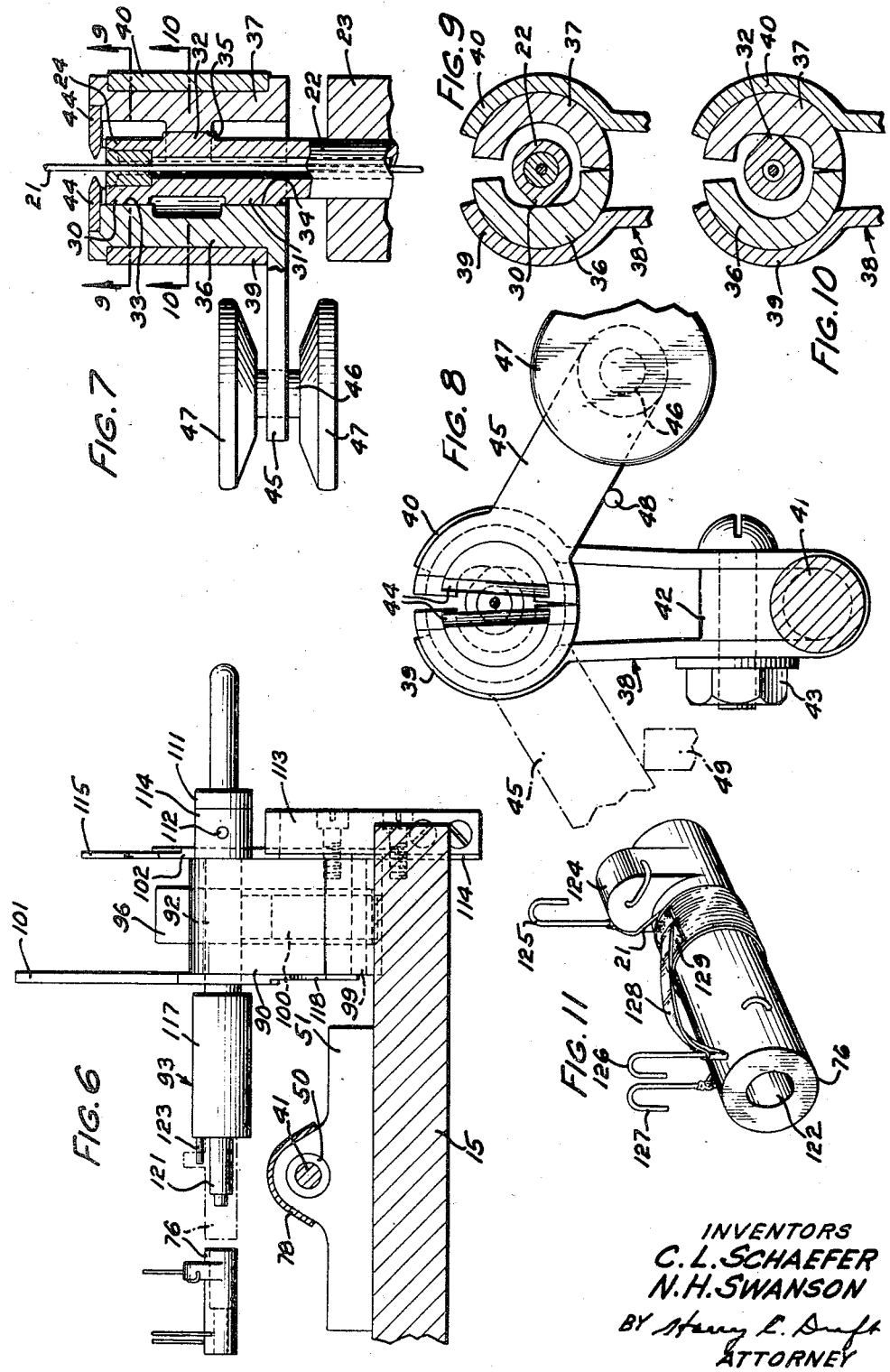
INVENTORS
C. L. SCHAEFER
N. H. SWANSON
BY
ATTORNEY Patented Jan. 13, 1948

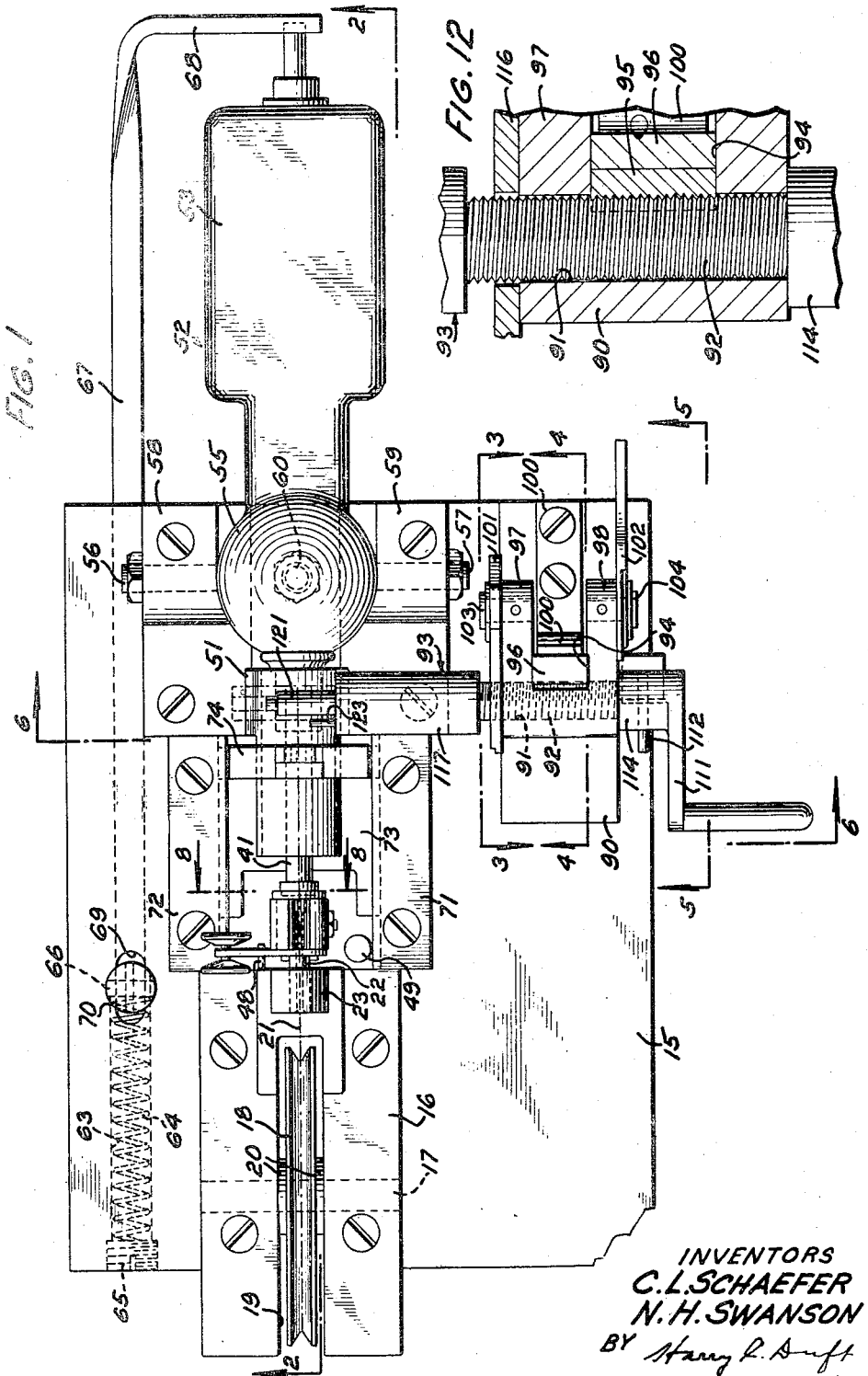

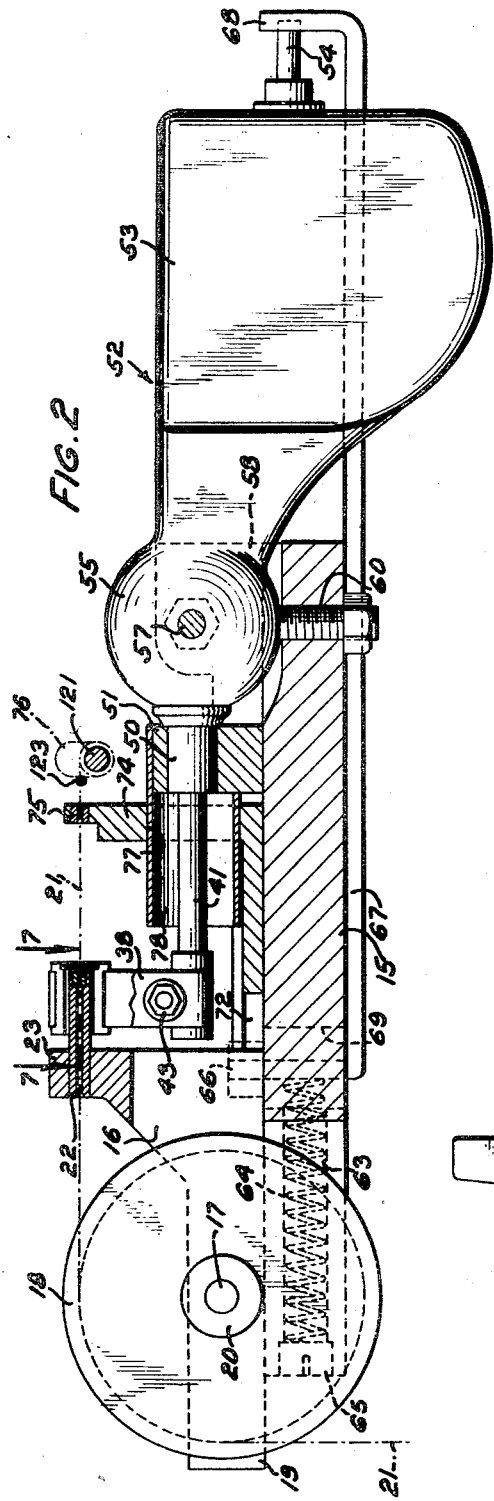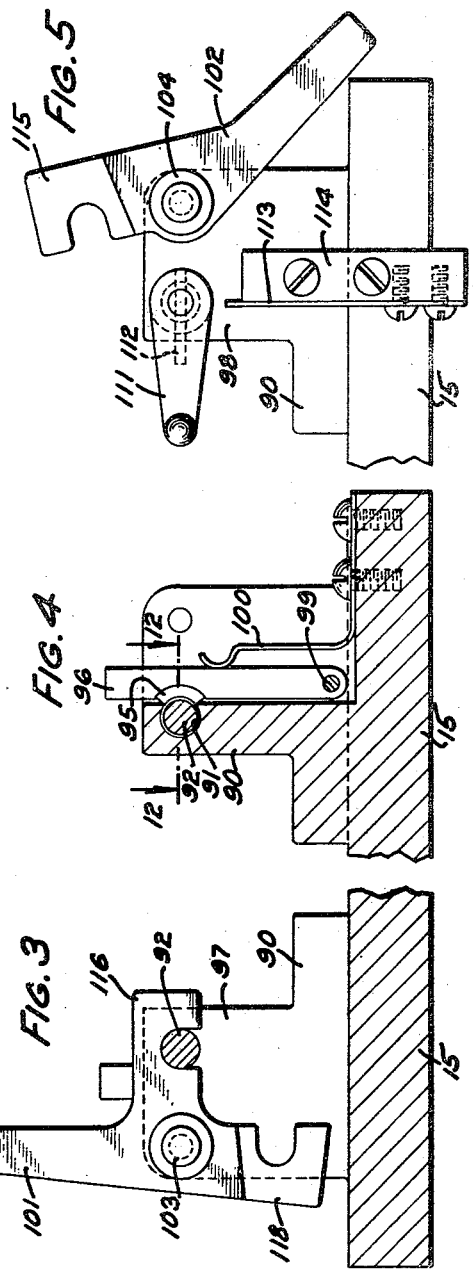

2,434,591

UNITED STATES PATENT OFFICE 2,434,591

COIL-WINDING APPARATUS

Cyril L. Schaefer, Chicago, and Nils H. Swanson, Zion, Ill., assignors to Western Electric Company, Incorporated, New York, N. Y., a corporation of New York Application June 27, 1945, Serial No. 601,824

9 Claims. (Cl. 140—1)

This invention relates to coil winding apparatus and more particularly to apparatus employed in the winding of center tapped coils.

In the manufacture of some types of coils, it is desirable to wind a serving of insulated wire on a core member and to make a connection at a mid point in the winding. In some coils of small size, this operation becomes exceedingly difficult due to the fact that the wire used is very fine and may be damaged if the insulating coating thereon is removed by sanding the wire. Furthermore, it is quite difficult to remove the insulation from a short section of the wire sufficient to attach a lead thereto and still avoid the removal of the insulation from an extended area of the wire, which might result in short-circuiting the adjacent turns of the coil.

It is an object of the present invention to provide a simple and efficient apparatus for expeditiously forming coils.

In accordance with one embodiment of the invention, a core member having terminal elements fixed thereon is mounted upon a rotary and reciprocatory spindle and wire from a supply is directed to the core member passing through an insulation stripping device in its passage from the supply to the core. The insulation stripping device comprises a pair of knives normally held out of engagement with the wire, but movable to engage the wire at diametrically opposite sides thereof and movable in a circular path through more than 180° about the axis of the wire while in engagement with the wire. The skinning knives are mounted on a vibratory shaft so that they may be reciprocated along the axis of the wire by the vibratory shaft while manually being moved in a semi-circular path, thus to strip the insulation from the wire in a restricted area. Suitable stop members are provided for gaging the number of turns of wire applied to the core during the rotation of the core and its longitudinal movement under control of a lead screw on the spindle.

A better understanding of the invention may be had by reference to the following detailed description when considered in conjunction with the accompanying drawings, wherein Fig. 1 is a plan view of a coil winding apparatus comprising the preferred embodiment of the present invention;

Fig. 2 is a vertical sectional view taken substantially along the line 2—2 of Fig. 1 in the direction of the arrows;

Fig. 3 is an enlarged vertical sectional view taken along the line 3—3 of Fig. 1 in the direction of the arrows and showing one of the stop mechanisms used in controlling the movement of the spindle and, consequently, controlling the number of turns applied to the core;

Fig. 4 is a vertical sectional view on an enlarged scale, taken substantially along the line 4—4 of Fig. 1 in the direction of the arrows, showing part of the mechanism for advancing the core supporting spindle during rotation of it;

Fig. 5 is a fragmentary front elevational view taken substantially along the line 5—5 of Fig. 1 in the direction of the arrows showing a stop for the spindle which may be used in the formation of coils of different sizes and also showing part of the drive mechanism for the spindle;

Fig. 6 is a transverse vertical sectional view taken substantially along the line 6—6 of Fig. 1 in the direction of the arrows and showing the spindle and stop mechanisms in elevation;

Fig. 7 is an enlarged fragmentary sectional view taken substantially along the line 7—7 of Fig. 2 in the direction of the arrows showing details of construction of the skinning mechanism for removing the insulation from the wire and its actuating mechanisms;

Fig. 8 is an enlarged transverse vertical sectional view taken substantially along the line 8—8 of Fig. 1 in the direction of the arrows showing the manner in which the insulation skinning mechanism is mounted upon the reciprocatory shaft;

Figs. 9 and 10 are transverse vertical sectional views taken substantially along the lines 9—9 and 10—10, respectively, of Fig. 7 showing the cam structure provided for normally holding the insulation skinning knives out of engagement with the wire and permitting its engagement with the wire under spring pressure;

Fig. 11 is a perspective view showing a coil of the type wound in the apparatus; and Fig. 12 is an enlarged horizontal sectional view taken substantially along the line 12—12 of Fig. 4 in the direction of the arrows showing details of construction of the drive screw for advancing the spindle during the rotation thereof.

In the drawings, the apparatus is shown mounted upon a base 15 having a journal block 16 mounted thereon for receiving a shaft 17, on which a sheave 18 is supported. The sheave 18 is positioned in a slot 19 in the journal block and is spaced from the walls of the slot by washers 20—20. This sheave 18 serves to guide a strand of enamel-coated wire 21 from a suitable supply thereof to a guide tube 22 mounted upon a central projection 23 of the journal block 16. The guide tube 22, as shown most clearly in Fig. 7, has a guiding ring 24 set into its free end for guiding and supporting the wire 21.

On its outer surface, the guide tube 22 has three camming projections 30, 31 and 32 (Figs. 7, 9 and 10) which cooperate with cam faces 33, 34 and 35, respectively, formed upon semi-cylindrical knife-supporting members 36 and 37, respectively. The knife-supporting member 36 has the cam faces 33 and 34 formed upon it, whereas the knife-supporting member 37 has the cam face 35 formed on it. These two knife-supporting members constitute complemental parts of a split tube and are urged together and supported by a U-shaped spring 38, having its upper ends bent to arcuate shape, as shown at 39 and 40. As shown in Fig. 8, the lower end of the U-shaped spring member 38 encircles a rod 41 and is held in place thereon by a clamping member 42, which is held in place between the arms of the spring by a nut and bolt assembly 43. By means of the clamping action of the clamp 42, the spring member 38 is rigidly fixed to the rod 41 and normally carries the knife-supporting members 36 in the position shown in the drawings, where the cams 30, 31 and 32 are bearing against the cam faces 33, 34 and 35.

The knife-supporting members 36 and 37 each carry a stripping or skinning knife 44 which, as shown in Figs. 7 and 8, are normally held out of engagement with the wire, but which may be caused to engage the wire when the knife-supporting members 36 and 37 are rotated from the position shown in Figs. 7 to 10 due to the movement of the knife-supporting members under the influence of the spring member 38 when the cam faces 33, 34 and 35 are moved out of engagement with the camming projections 30, 31 and 32 due to the members 36 and 37 being rotated about the guide tube 22. In order to rotate the knife-supporting members 36 and 37, the member 36 is provided with a lever 45, which may be rocked from the position shown in full lines in Fig. 8 to the position shown in dot and dash lines. While there is no positive connection between the knife-supporting member 36 and the knife-supporting member 37, it will be apparent that, when the member 36 is rotated about the axis of the wire, it will engage and move the knife-supporting member 37. The free end of the lever 45 has a shaft 46 freely slidable and rotatable therein for supporting buttons 47—47, which an operator may grasp in order to move the lever 45 from one position to another. In its normal inoperative position, the lever 45 engages a pin 48 mounted on a portion of the journal block 16 and its movement beyond the position shown by dot and dash lines in Fig. 8 is limited by a pin 49 extending upwardly from the base 15.

The rod 41 is slidable in a bearing member 50, which is mounted in a bracket 51, in turn mounted upon the base 15. The bearing member 50 comprises a part of a suitable vibrator, designated generally by the numeral 52, and including an electric motor 53 operable under control of a push button switch 54. The vibrator has a ball-shaped member 55 comprising a portion of its housing, which is suitably attached to the base 15 by clamping screws 56 and 57 threaded into guide plates 58 and 59, respectively, suitably mounted on the base 15. The vertical position of the ball-shaped member 55 may be adjusted by an adjusting screw 60, which cooperates with the bearing member 50 in the bracket 51 to properly align the rod 41. The push button switch 54 serves to control the motor 53 in a manner common to such mechanism in that operation of the push button switch 54, when the motor is not running, will initiate operation of it and when the motor is running, actuation of the switch 54 will stop the motor. While a specific type of motor and mounting therefor have been described hereinbefore, it will be understood that any suitable vibrator motor may be provided which will impart longitudinal reciprocation to the rod 41.

The base 15, as shown most clearly in Figs. 1 and 2, has a hole 63 formed in it for receiving a compression spring 64, which is held in the hole by a block 65 threaded into the end of the hole to hold the spring 64 under compression against an upwardly extending portion 66 of a control bar 67. The control bar 67 is bent at 68 (Figs. 1 and 2) to engage the push button switch 54, and the upwardly extending portion 66 of the control bar 67 extends through an aperture 69 in the base 15 and carries a button 70, whereby the control bar may be manipulated to actuate the push button switch 54.

Mounted on the upper surface of the base 15 are a pair of guide plates 71 and 72 for slidably receiving the edges of a guide supporting plate 73. The guide supporting plate 73 carries a wire guide member 74, in which there is mounted a guide sleeve 75 that serves to guide the wire 21 to a core member 76, upon which the wire is being wound. The wire guide member 74 has a cut-out 77 formed in it, through which an irregularly shaped shield member 78 extends. The shield member 78 serves to prevent the entanglement of the wires on the core member 76 with the rod 41, the shield member being fixed to the bracket 51 and the wire guide member 74 being freely slidable with respect thereto. Thus, the wire guide member 74 may be moved from the position shown in Figs. 1 and 2 back to a position adjacent the spring member 38 when certain operations are being performed upon the coil, as will be described hereinafter. The guide sleeve 75 serves to support and guide the wire 21 when the insulation on the wire is being stripped or skinned therefrom by the skinning knives 44—44.

Extending upwardly from the base 15 is a bearing block 90 having a smooth bored aperture 91 formed therein for receiving a threaded shank 92 of a mandrel 93. The bearing block 90 is cut away, as shown at 94, to a depth such that the teeth of the threaded shank 92 of the mandrel are exposed to engagement by a half nut 95 set into a lever 96, which is guided by the side walls 97 and 98 formed by cutting away a portion of the bearing block at 94. The lever 96 is pivotally mounted on a pin 99, which extends into the side walls 97 and 98, and the lever 96 is normally urged to carry the half nut 95 into engagement with the threads on the threaded shank 92 by a leaf spring 100 suitably mounted on the base 15. In addition to serving as a guide and pivot support for the lever 96, the walls 97 and 98 carry gage members 101 and 102, which are pivotally mounted on the walls 97 and 98 by means of pivot pins 103 and 104.

The mandrel 93 is adapted to be rotated in a clockwise direction, as viewed in Fig. 5, by means of a handle 111 suitably attached to the mandrel and carrying a pin 112 which, in the rotation of the handle 111 in a clockwise direction, will engage a leaf spring 113 mounted on a block 114. The leaf spring 113 may be flexed away from the block 114 when the handle and the mandrel are rotated clockwise, but will serve as an abutment to prevent reverse motion of the handle, as will be apparent by reference to Fig. 5. The pin 112 is mounted in a collar portion 114 of the handle which, in the position shown in Figs. 1 and 12, abuts the bearing block 90 to position the mandrel 93 for operation. If a shorter coil than that illustrated in Fig. 11 is to be wound on the apparatus, the gage member 102 may be rocked from the position shown in Fig. 5 to a position where a reduced portion 115 thereof will be interposed between the collar portion 114 of the handle and the bearing block 90 to limit the movement of the handle toward the bearing block. The gage member 101 has two operative positions, one of which is shown in Fig. 3, wherein a relatively thick portion 116 thereof is in position to block movement of the mandrel beyond a predetermined position due to the engagement of an enlarged portion 117 of the mandrel with the gage member. During the winding of a coil in the apparatus, a relatively thin portion 118 of the gage may be moved into position to be engaged by the enlarged portion 117 of the mandrel, as will be described in connection with the description of the operation of the apparatus.

Mounted on the free end of the mandrel 93 is a core-engaging projection 121, which is adapted to enter a central aperture 122 in the core member 76 (Fig. 11), thus to support the core member 76 during the application of the wire 21 thereto. The enlarged portion 117 of the mandrel 93 has a pin 123 extending therefrom parallel to the axis of the mandrel to engage a projection 124 on the core member 76, whereby the core member will be rotated with the mandrel. Fixed in the projection 124 is a terminal member 125 comprising a relatively stiff wire, to which the lead end of the wire 21 may be soldered. In addition to the terminal member 125, two other terminal members 126 and 127 are also fixed to the core member 76 to serve as terminals for the center tap and last wound end of the wire 21. The center tap terminal 126 is interconnected with the portion of the wire from which the insulation is scraped by means of a connector member 128 after an insulator strip 129 has been placed under the skinned portion of the wire 22.

In the operation of the apparatus, a core member 76 is placed on the core-engaging projection 121 of the mandrel 93 with the half nut 95 engaging the threaded shank 92 of the mandrel in the position shown in Figs. 1 and 12. The wire guiding member 77 may be slid from the position shown in Fig. 2 to the left so that the core member 76 will be readily accessible to an operator to attach the leading end of the wire 21 to the terminal member 125. After the leading end of the wire 21 has been attached to the terminal member 125, the handle 111 may be rotated clockwise (Fig. 5) to wind a wire onto the core member until the enlarged portion 117 of the mandrel 93 engages the relatively thick portion 116 of gage member 101. After a predetermined number of turns have been wound on the core, as indicated to the operator by the number of times the spring 113 clicks due to its engagement by and escape from the pin 112, the winding, by means of the handle 111, may be interrupted and while the wire is thus held between the sheave 18 and the core member 76, the button 70 may be manipulated to initiate operation of the vibrator 52. As soon as the vibrator 52 starts to operate, the operator may grasp the buttons 47—47 and rock the lever 45 through approximately 210° from the position in engagement with the pin 48 to position in engagement with the pin 49. In moving from the position shown in full lines in Fig. 8 to the position shown in dot and dash lines, the lever 45 will rock the knife-supporting members 36 and 37 through approximately the same arc that the lever 45 moves through and, in so doing, the knife-supporting members will move toward the wire 21 to carry the knives 44—44 into engagement with the insulation on the wire. This rocking of the supporting members 36 and 37 will move the cam faces 33, 34 and 35 out of engagement with the camming projections 30, 31 and 32 and spring 38 will thus move the knives 44—44 towards each other. Since the knives 44—44 are carried by the spring 38 mounted on the rod 41, the knives will be vibrated over a short distance during their partial rotation around the wire, thus to scrape all the insulation from the wire 21 in a restricted area. After the wire has been scraped and the insulation skinned from it by the skinning knives 44—44, the mandrel may be rotated by a handle 111 to carry the bared portion of the wire 21 into close proximity to the core member 76, whereupon the piece of insulation or the insulator strip 129 may be placed on the core and the connector member may be placed over the insulator and soldered to the bare place on the wire, whereupon the connector member 128 may be bent out of the path of succeeding turns of wire to be wrapped on the core member 76 and the rotation of the mandrel 93, by means of the handle 111, may be resumed after the relatively thick portion 116 of the gage member 101 has been moved out of engagement with the enlarged portion 117 of the mandrel and the relatively thin portion 118 of the gage member 101 has been positioned in the path of the large portion 117 of the mandrel, whereupon winding of the coil may proceed until a predetermined number of turns may be wound thereon, as indicated by the number of times that the spring 113 is operated and thereupon a new section of wire 21 may be stripped of its insulation by again operating the vibrator 52 and manipulating the buttons 47—47. After a coil has been wound on the core and soldered to the terminal members 126 and 127, the center tap being connected to the terminal 126 by the connector member 128, the core may be removed from the winding apparatus and the half nut 95 may then be disengaged from the threaded shank 92 of the mandrel 93 to permit the mandrel to be reset for the winding of a succeeding core. In the event that a smaller number of turns are to be applied to a core, the gage member 102 may be interposed between the bearing block 90 and the collar 114, to thus restrict the movement of the mandrel under influence of the half nut 95 to a smaller distance.

What is claimed is:

1. In a coil winding apparatus, a rotary mandrel for supporting a core, means for rotating said mandrel, a wire delivering sheave, wire skinning means positioned coaxially with respect to the wire intermediate the sheave and mandrel, means for reciprocating the skinning means longitudinally of the wire, and means operable for engaging the skinning means with the wire and for rotating said skinning means about said wire during reciprocation of said skinning means for removing insulation from the wire.

2. In a coil winding apparatus, an insulation stripping mechanism comprising means for supporting a length of wire having insulation thereon, a vibratory rod, means for imparting longitudinal vibrations to said rod, spring means on said rod for movement therewith, rotary knife-supporting means rotatably supported by said spring for movement therewith, a stationary wire guiding member interposed between said knife-supporting means, and means for rotating said knife-supporting means about the stationary wire guiding member to render the spring means effective for engaging the knives carried by the knife-supporting members into engagement with the wire.

3. In an apparatus for skinning insulation from insulated wire at spaced intervals, a vibratory rod, a wire skinning knife, and means carried by the rod for supporting the knife including a knife-supporting member, means for urging the knife-supporting member to carry the knife into engagement with the wire, means for rotating said skinning knife about the axis of the wire, and cam means associated with the knife-supporting member for normally holding the knife out of engagement with the wire.

4. In an apparatus for skinning insulation from insulated wire at spaced intervals, a vibratory rod, wire skinning knives, knife-supporting members individual to said knives for supporting them, resilient means carried by the rod for supporting said members and urging the members to carry the knives into engagement with the wire, a stationary wire guiding means, camming projections on said means, cam surfaces on said supporting members for cooperation with said camming projections normally to hold the knives out of engagement with the wire, and means for rotating the knife-supporting members with respect to the wire guiding means for disengaging the camming surfaces from the camming projections to engage the knives with the wire and rotate the knives through a portion of a revolution while in engagement with the wire to strip the insulation therefrom.

5. In a coil winding apparatus, a rotatable mandrel having a threaded portion, a bearing block for slidably and rotatably engaging said threaded portion to support the mandrel, a threaded member mounted in said bearing block and normally urged to engage its threads with the threaded portion of the mandrel to advance the mandrel upon rotation thereof, wire guiding means for directing a strand of wire to the mandrel, knife-supporting members normally held in a predetermined position by said wire guiding means, means for imparting vibration to said knife-supporting members longitudinally of the wire, means for oscillating the knife-supporting means about the axis of the wire to disengage the knife-supporting members from the wire guiding means, and knives on said knife-supporting means engageable with the wire when the knife-supporting means are oscillated.

6. In a coil winding apparatus, a rotatable and reciprocatable mandrel, means for indicating the number of rotations of said mandrel, wire guiding means for directing insulated wire to said mandrel, intermittently operated vibratory means associated with said guiding means for stripping insulation from said insulated wire at spaced intervals including stripping knives, said means movable through a circular path for engaging the knives with the wire and rotating the knives about the axis of the wire through a predetermined portion of a revolution.

7. In a coil winding apparatus, a rotatable and reciprocatable mandrel, means for indicating the number of rotations of said mandrel, wire guiding means for directing insulated wire to said mandrel, intermittently operable vibratory means associated with said guiding means for stripping insulation from said insulated wire at spaced intervals including stripping knives, means movable through a circular path for engaging the knives with the wire and rotating the knives about the axis of the wire through a predetermined portion of a revolution, and gaging members interposable in the path of reciprocation of the mandrel for stopping the rotation and reciprocation of the mandrel after a predetermined number of turns of wire have been wound on a core carried by the mandrel.

8. In a coil winding apparatus, a rotatable and reciprocatable mandrel, means for indicating the number of rotations of said mandrel, wire guiding means for directing insulated wire to said mandrel, intermittently operated vibratory means associated with said guiding means for stripping insulation from said insulated wire at spaced intervals including stripping knives, and means movable through a circular path for engaging the knives with the wire and rotating the knives about the axis of the wire through a predetermined portion of a revolution, said vibratory means including a vibratory rod, resilient means carried by said rod, and a pair of knife-supporting members urged toward each other by said resilient means, the knives being carried by said knife-supporting members and said resilient means serving to support the knife-supporting members for rotation.

9. In a coil winding apparatus, a rotatable and reciprocatable mandrel, means for indicating the number of rotations of said mandrel, wire guiding means for directing insulated wire to said mandrel, intermittently operated vibratory means associated with said guiding means for stripping insulation from said insulated wire at spaced intervals including stripping knives, and means movable for engaging the knives with the wire, said vibratory means including a vibratory rod, resilient means carried by said rod, and a pair of knife-supporting members urged toward each other by said resilient means, the knives being carried by said knife-supporting members.

CYRIL L. SCHAEFER.
NILS H. SWANSON.

REFERENCES CITED

The following references are of record in the file of this patent:

UNITED STATES PATENTS

| Number | Name | Date |
| --- | --- | --- |
| 1,632,095 | Newton | June 14, 1927 |
| 2,371,782 | Sirp | Mar. 20, 1945 |
| 1,947,449 | Anderson et al. | Feb. 20, 1934 |
| 1,969,517 | Malloy | Aug. 7, 1934 |
| 1,936,559 | Williams | Nov. 21, 1933 |
| 2,307,046 | Johnson et al. | Jan. 5, 1943 |
| 1,930,219 | Zimber | Oct. 10, 1933 |